(12) United States Patent
Sakakibara et al.

(10) Patent No.: US 7,796,308 B2
(45) Date of Patent: Sep. 14, 2010

(54) IMAGE READING APPARATUS

(75) Inventors: Akihiro Sakakibara, Toyota (JP); Takashi Ohama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 990 days.

(21) Appl. No.: 11/521,499

(22) Filed: Sep. 15, 2006

(65) Prior Publication Data

US 2007/0058220 A1    Mar. 15, 2007

(30) Foreign Application Priority Data

Sep. 15, 2005  (JP) .............................. 2005-268456

(51) Int. Cl.
 *H04N 1/04*  (2006.01)
(52) U.S. Cl. ...................... 358/474; 358/498; 358/496; 358/497; 358/486; 271/314; 271/212; 271/127; 271/226; 399/377; 399/367; 399/380
(58) Field of Classification Search ................. 358/474, 358/497, 498, 501, 486, 496; 271/314, 212, 271/127, 226; 399/377, 367, 380
See application file for complete search history.

(56) References Cited

U.S. PATENT DOCUMENTS

| | | | |
|---|---|---|---|
| 5,743,522 A | | 4/1998 | Rubscha |
| 5,796,928 A | * | 8/1998 | Toyomura et al. ............ 358/1.6 |
| 5,805,308 A | | 9/1998 | Tanaka et al. |
| 5,912,747 A | * | 6/1999 | Murakami ................... 358/497 |
| 6,433,886 B1 | * | 8/2002 | Sekiguchi .................. 358/1.16 |
| 7,688,482 B2 | * | 3/2010 | Iwago ........................ 358/496 |
| 7,697,174 B2 | * | 4/2010 | Sakakibara et al. .......... 358/474 |
| 2003/0231288 A1 | * | 12/2003 | Sugeta ......................... 355/40 |
| 2006/0104684 A1 | * | 5/2006 | Kohchi et al. ............... 399/377 |
| 2007/0097457 A1 | * | 5/2007 | Kawai et al. ................ 358/488 |
| 2009/0140490 A1 | * | 6/2009 | Kozaki ....................... 271/109 |

FOREIGN PATENT DOCUMENTS

| | | |
|---|---|---|
| JP | 5-204208 A | 8/1993 |
| JP | 6062170 | 3/1994 |
| JP | 7-221932 A | 8/1995 |
| JP | 8-254407 A | 10/1996 |
| JP | 10152230 | 6/1998 |
| JP | 11220585 | 8/1999 |

OTHER PUBLICATIONS

JP Office Action dtd Jun. 29, 2010, JP APpln. 2005-268456, English Translation.

* cited by examiner

*Primary Examiner*—Negussie Worku
(74) *Attorney, Agent, or Firm*—Banner & Witcoff, Ltd.

(57) ABSTRACT

An image reading apparatus capable of easily detecting the width of a document is provided that can reduce the number of component parts. A surface to be detected of a moving section that moves in linkage with the movement of a document guide is detected using an image pickup device, so that the width dimension of the document is detected. This allows the image reading apparatus to detect the width dimension of the document by using the image pickup device.

10 Claims, 9 Drawing Sheets

IMAGE READING APPARATUS

CROSS-REFERENCE OF RELATED APPLICATION

This nonprovisional application claims priority under 35 U.S.C. §119(a) on Patent Application No. 2005-268456 in Japan on Sep. 15, 2005, the entire contents of which are hereby incorporated by reference.

BACKGROUND

The present invention relates to an image reading apparatus for optically reading an image recorded on a document, on the basis of a detection signal of an image pickup device.

In an image reading apparatus such as a scanner, light is projected onto a document placed on an image reading window configured of a transparent member such as a glass plate, and then the light reflected from the document is converted into an electric signal by an image pickup device such as a CCD (Charge-Coupled Device) and a CIS (Contact Image Sensor), so that the image such as characters recorded on the document is read.

Methods of placing a document on an image reading window include: a method that a user (person) places a document directly on an image reading window; and a method that a document placed on a document placement section provided separately from an image reading window is fed to a document reading window automatically by an automatic document feeder.

In the method of automatic feeding to the document reading window, it need be detected whether all the documents placed on the document placement section are fed to the image reading section, that is, whether any document is present in the document placement section. Then, on the basis of this detection result, stop control need to be performed for the automatic document feeder.

For example, Japanese Patent Application Laid-Open No. H10-152230 describes that a plurality of swingable arm-shaped sensor actuators are provided such that the tip side of each sensor actuator contacts with a document placed on a document placement section. Then, on the basis of whether these sensor actuators contact with a document, it is detected whether any document is present in the document placement section.

BRIEF SUMMARY

When reading an image formed on a document, in place that image data is solely obtained, it is preferable that the width dimension and the like of the document is detected simultaneously. This is, for example, because a storage area for storing the obtained image data need be allocated, and because in the case of facsimile transmission of the obtained image data, the image needs to be enlarged or reduced in correspondence to the destination.

Here, the "width (width dimension) of a document" indicates a dimension in the direction perpendicular to both of the feeding direction of the document in an automatic document feeder and the thickness direction of the document.

In order to satisfy the above-mentioned desire, similarly to Japanese Patent Application Laid-Open No. H10-152230, a method can be devised that a plurality of sensor actuators that contact with the width direction edge of a document placed on a document placement section are provided so that on the basis of whether these sensor actuators contact with the document, the width of the document is detected.

Nevertheless, this method requires sensors such as switches for detecting whether the sensor actuators contact with the document. This causes an increase in the number of component parts and the number of assembling process steps, and hence results in an increase in the manufacturing cost of the image reading apparatus.

There is provided an image reading apparatus according to an aspect for reading an image recorded on a document, comprising: a document placement section onto which said document is placed; a document feeding unit for feeding said document placed on said document placement section; a reading window on which said document fed by said document feeding unit is located; an image pickup device for reading said image through said reading window; a document guide for contacting with said document placed onto the document placement section and thereby guiding the document feeding, the document guide being provided in a manner movable in a width direction of the document which is perpendicular to a feeding direction of the fed document; and a moving section provided for detecting a size of said document, the moving section moving in linkage with the said document guide and opposing said reading window, wherein said image pickup device reads a portion image which includes said moving section, and said image reading apparatus comprises a controller capable of detecting a position of said moving section based on said portion image read by said image pickup device; and calculating a width dimension of the document based on the detected position of said moving section.

The above and further objects and features will more fully be apparent from the following detailed description with accompanying drawings.

DETAILED DESCRIPTION OF THE EXEMPLARY EMBODIMENTS

Embodiments are described below or an image reading apparatus that has an automatic feeding and reading function of automatically feeding a document and then reading an image described in the document, and a static document reading function of reading an image described in a document placed statically.

The present embodiment is explained below with reference to the drawings.

Figure 1:
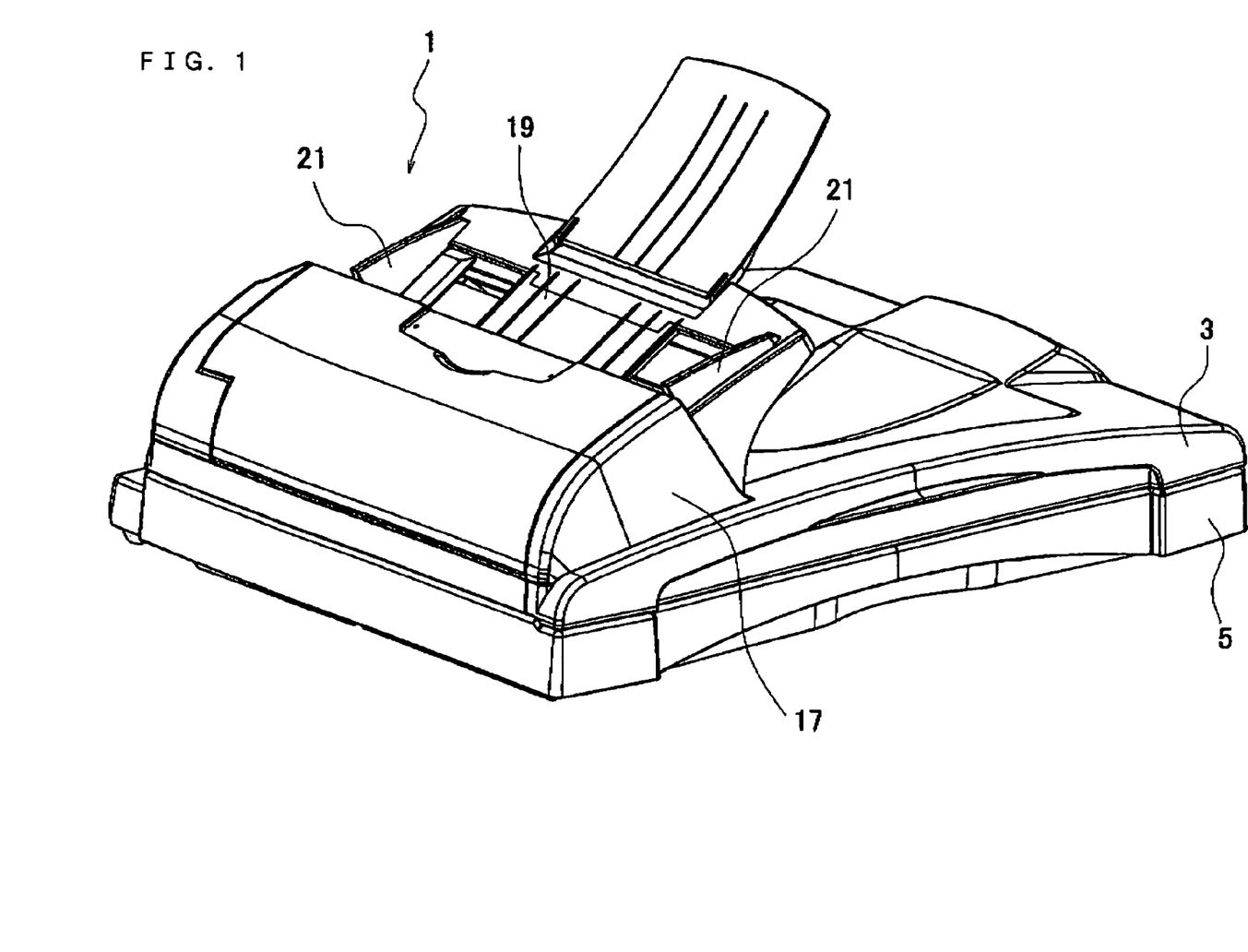
FIG. 1 is an external appearance perspective view of an image reading apparatus 1 according to an embodiment.
Figure 2:
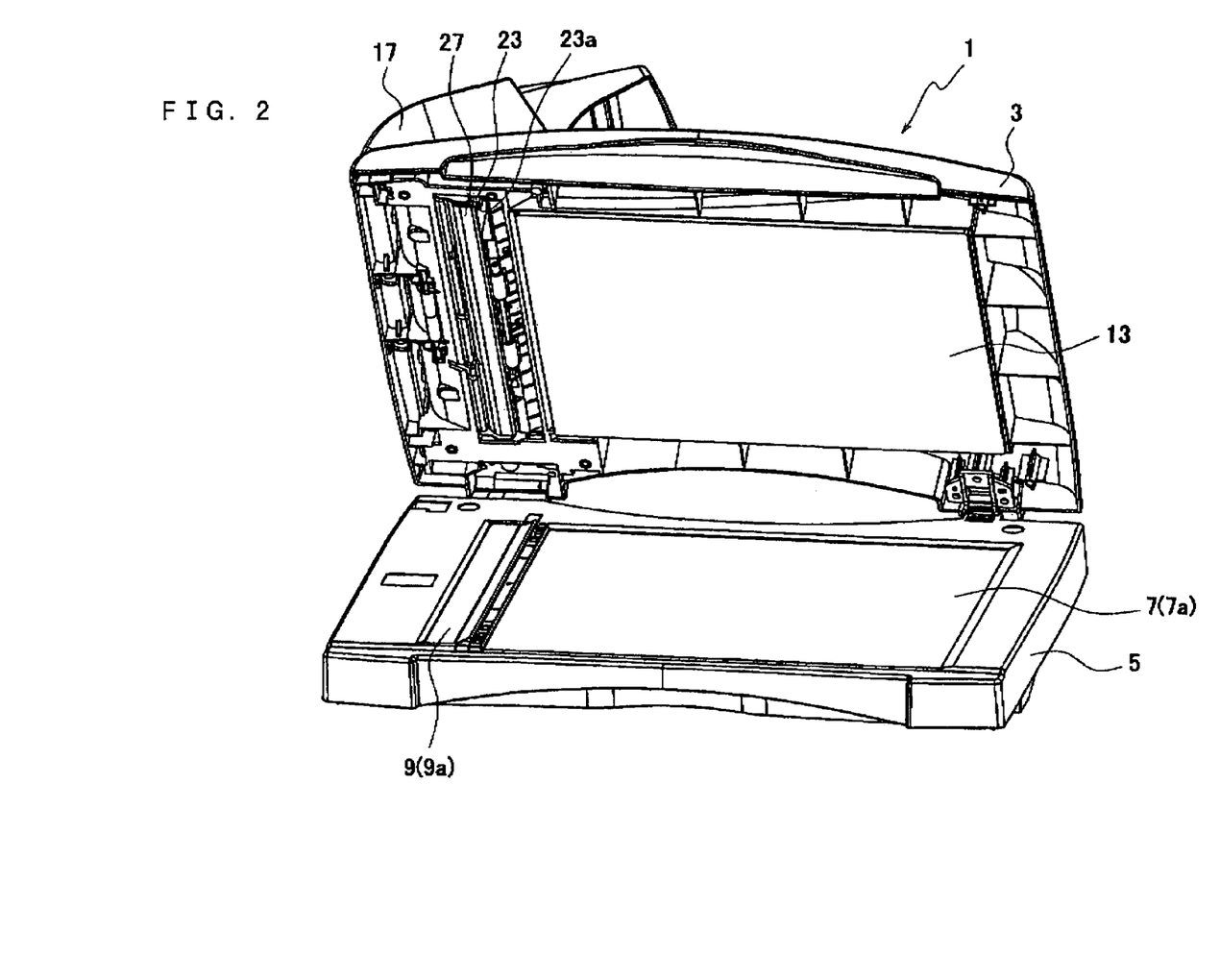
FIG. 2 is a perspective view of an image reading apparatus according to the embodiment in a state that a document cover 3 is opened.
Figure 3:
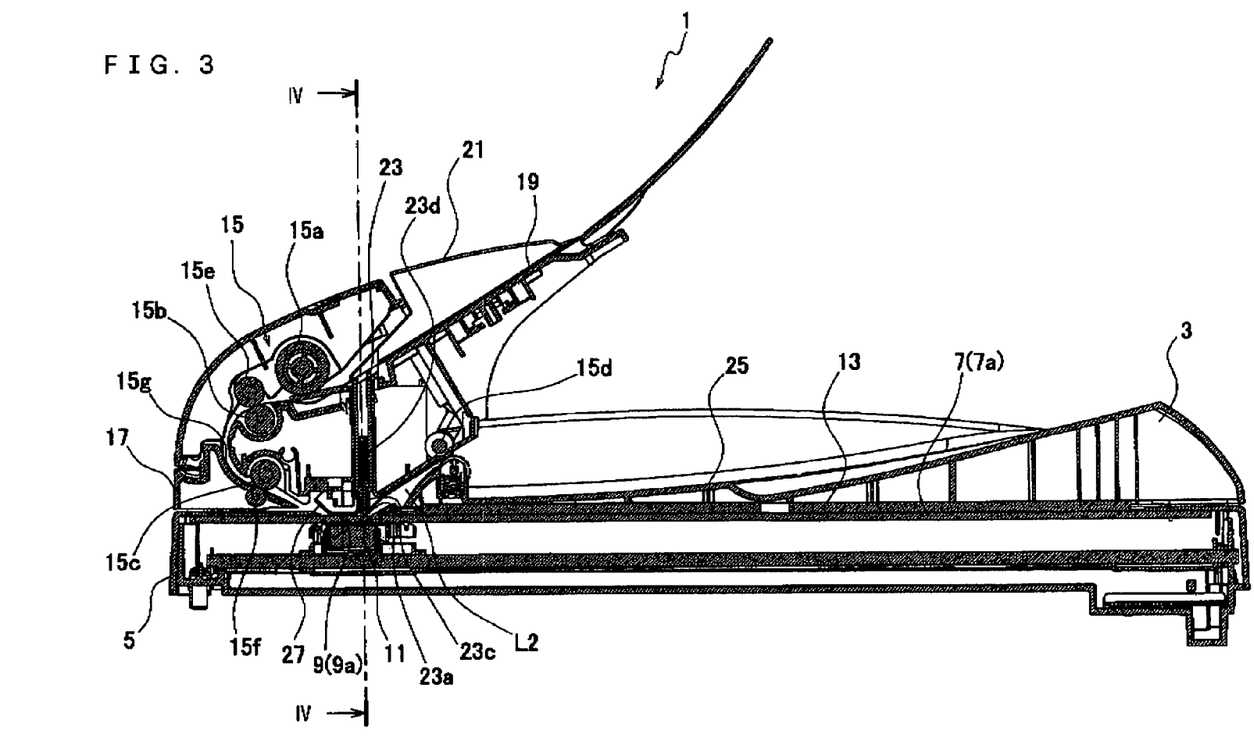
FIG. 3 is a diagram showing a part of a cross-section of an image reading apparatus 1 according to the embodiment.

FIG. 1 is an external appearance perspective view of an image reading apparatus 1 according to the present embodiment. FIG. 2 is a perspective view showing a state that a document cover 3 is opened. FIG. 3 is a diagram showing a part of a cross-section of the image reading apparatus 1.

As shown in FIG. 2, a main body 5 to which a document cover 3 is attached in a swingable manner has an image reading window for the static document reading function (a static reading window, hereinafter) 7 and an image reading window for the automatic feeding and reading function (an automatic reading window, hereinafter) 9. Both reading windows 7 and 9 are closed with transparent platens 7a and 9a such as glass and acrylic plates.

In FIG. 3, an image pickup device 11 receives light projected onto and reflected from a document, and then generates an electric signal on the basis of the received light. The image reading apparatus 1 converts into an electric signal an image such as characters described in a document by means of the image pickup device 11, and thereby reads the image.

The image pickup device 11 is installed in the main body 5 in a manner movable in the longitudinal direction (the right and left directions of FIG. 3) of the main body 5. In the operation of automatic feeding and reading function, the image pickup device 11 reads an image in a state of being stopped immediately under the automatic reading window 9. On the other hand, in the operation of static document reading function, the image pickup device 11 reads an image in a state of moving immediately under the static reading window 7.

Here, in the present embodiment, the image pickup device 11 employs a CIS (Contact Image Sensor). The longitudinal direction of the image pickup device 11 is in a direction (the width direction of the main body 5) perpendicular to its moving direction immediately under both reading windows 7 and 9.

In a document cover 3 region that opposes the static reading window 7, a static document push 13 is arranged for pressing down the document placed on the static reading window 7 toward the static reading window 7. The static document push 13 swings relative to the main body 5 (the static reading window 7) integrally with the document cover 3.

In a document cover 3 region that opposes the automatic reading window 9 and in the vicinity of the region, an automatic document feeder (an ADF, hereinafter) is provided that is constructed from an automatic document feeding mechanism 15 and the like for feeding a to-be-read document to the automatic reading window 9. Details of the ADF are described below.

Figure 4:
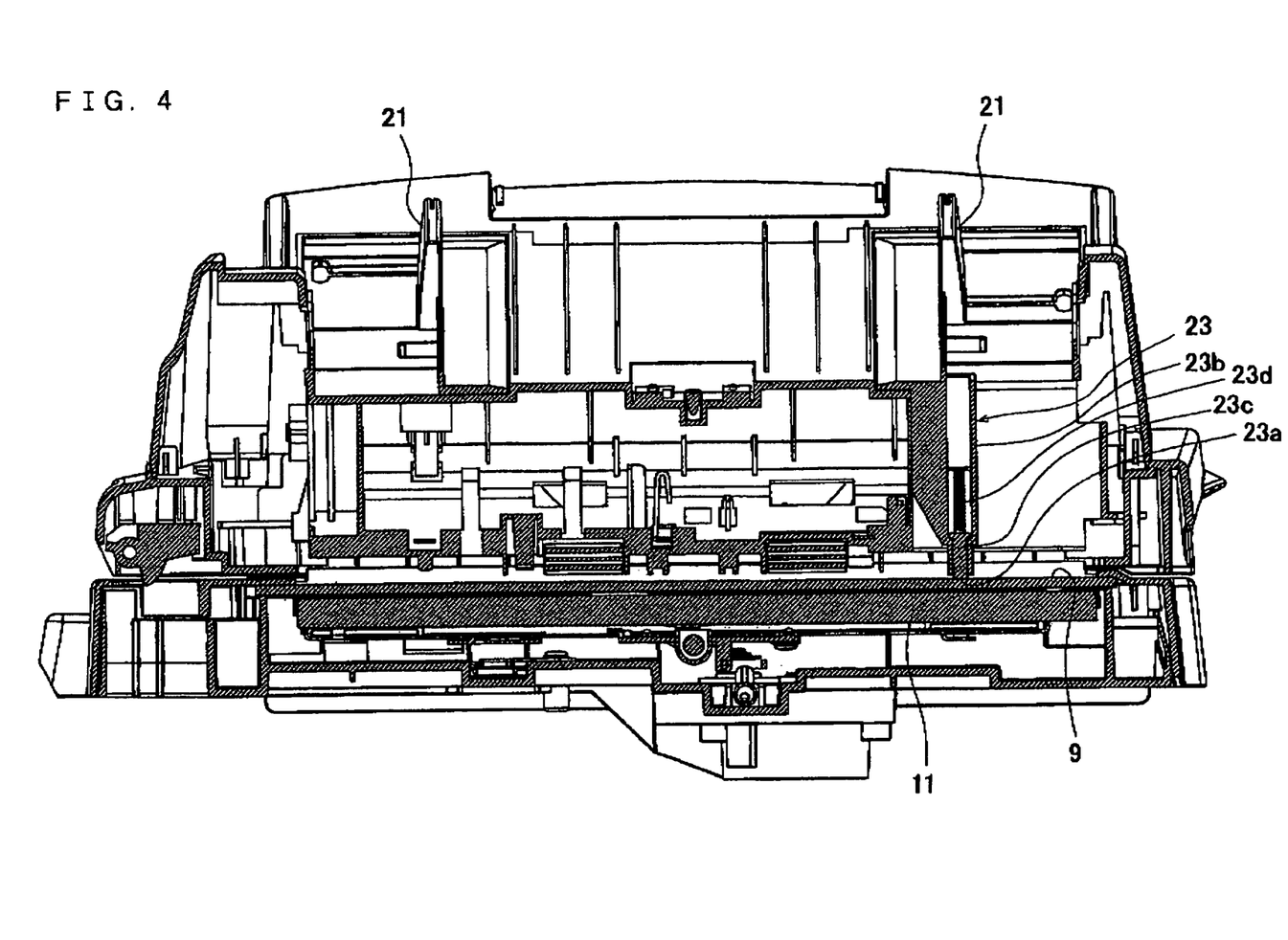
FIG. 4 is a sectional view of FIG. 3 taken along line VI-VI.
Figure 5:
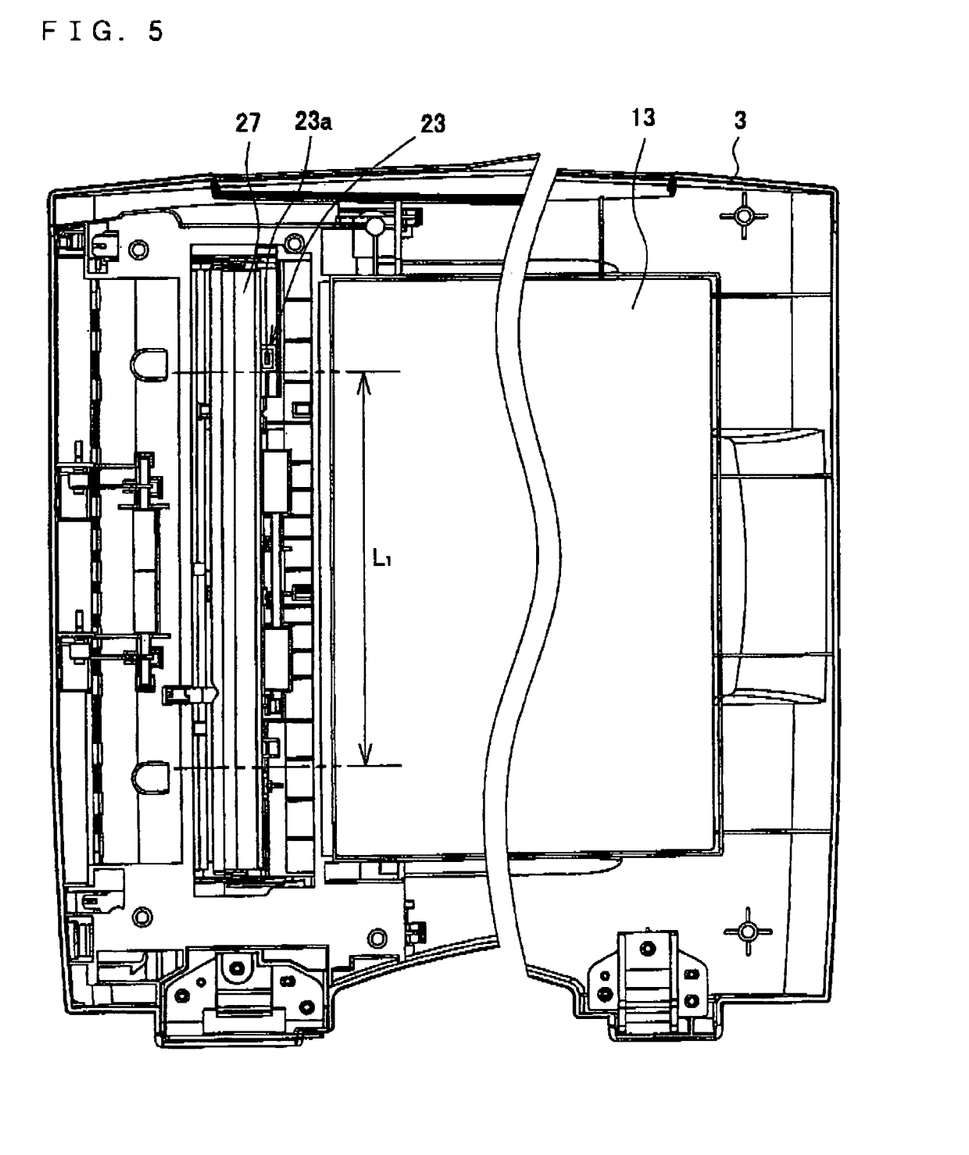
FIG. 5 is a bottom view of a document cover 3 in an image reading apparatus according to the embodiment, in which the document cover 3 is viewed from a direction perpendicular to a static document push 13.
Figure 6:
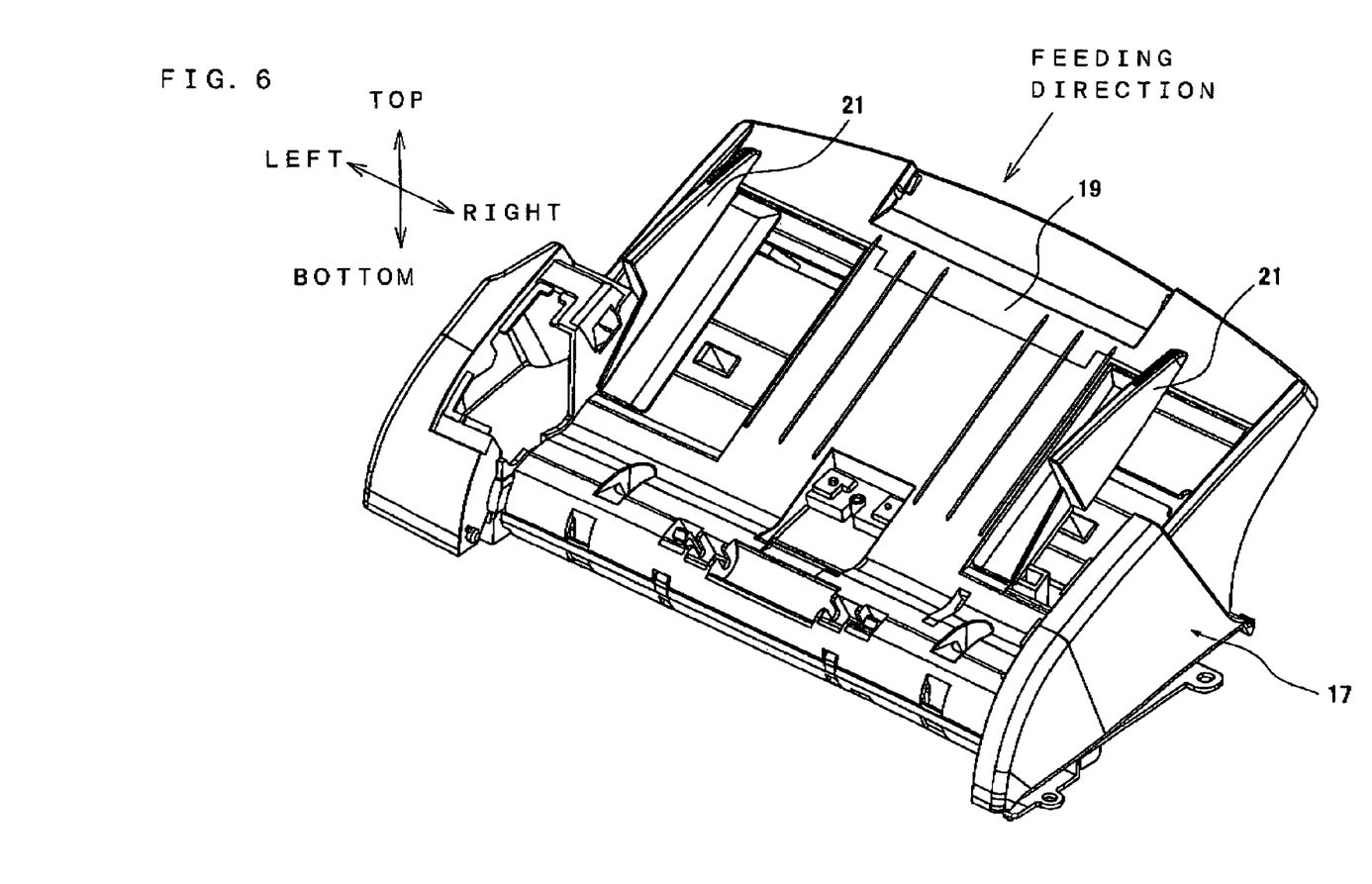
FIG. 6 is a perspective view of a base member 17 of an ADF in an image reading apparatus according to the embodiment.
Figure 7:
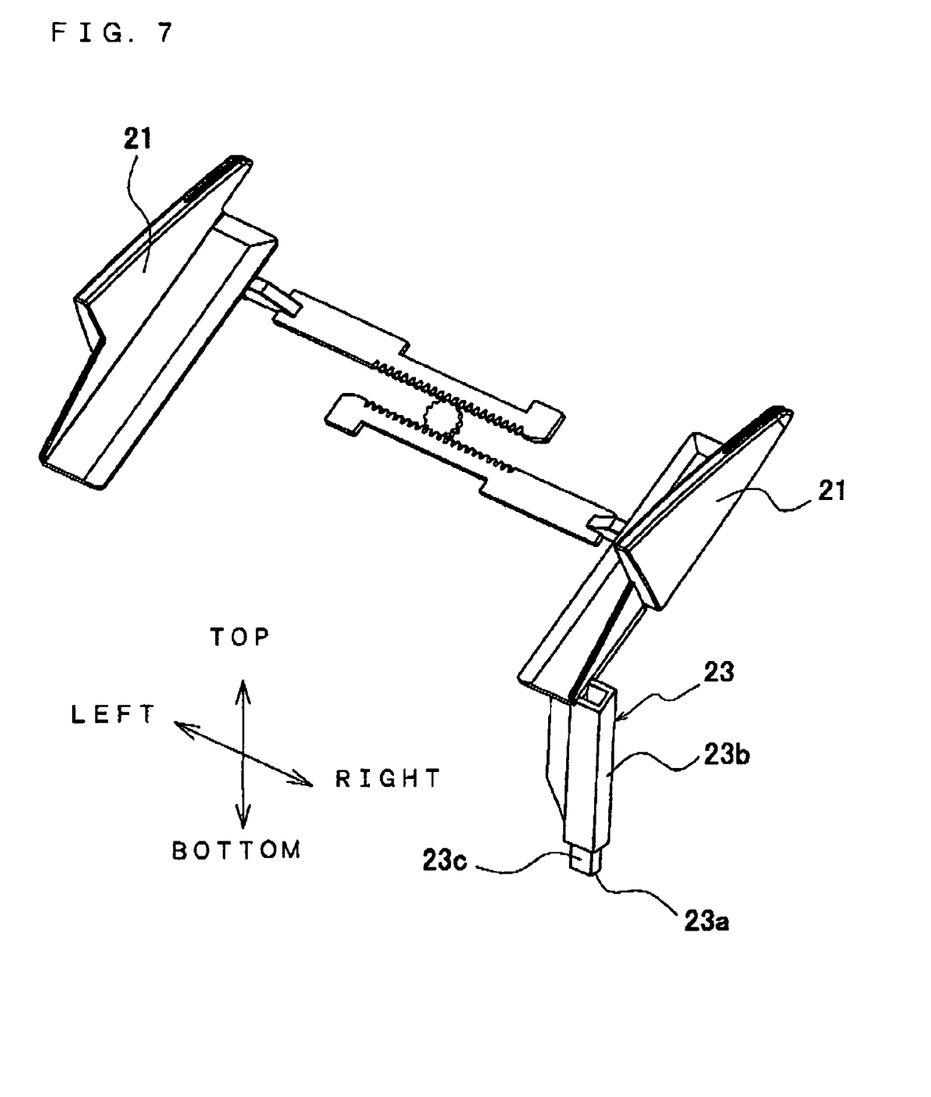
FIG. 7 is a perspective view of document guides 21 in an image reading apparatus according to the embodiment.

FIG. 4 is a sectional view of FIG. 3 taken along line IV-IV. FIG. 5 is a bottom view of the document cover 3, in which the document cover 3 is viewed from a direction perpendicular to the static document push 13. FIG. 6 is a perspective view of a base member 17 of the ADF. FIG. 7 is a perspective view of document guides 21.

In the base member 17 shown in FIG. 6, a document placement section (a document tray) 19 is installed, onto which to-be-read documents to be fed by the automatic reading window 9 are placed. The base member 17 is a member to which various kinds of rollers 15a-15d (see FIG. 3) that constitute the automatic document feeding mechanism 15 are attached. The base member 17 is fixed to the document cover 3 with fastening means such as screws.

As shown in FIG. 3, the document placement section 19 is inclined such that the suction roller 15a side is the lower. Thus, the document placed on the document placement section 19 moves toward the suction roller 15a by self weight.

As shown in FIG. 6, in the document placement section 19, a pair of document guides 21 that contact with the side edges of the document parallel to the feeding direction and thereby guides the feeding of the document are provided at both edges of the width direction of the document placed on the document placement section 19. The pair of document guides 21 are attached to the document placement section 19 such as to move in the width direction of the document in a mechanically linked manner.

The "width direction of the document" indicates a direction perpendicular to both of the feeding direction of the document placed on the document placement section 19 (see FIG. 6) and the thickness direction of the document placed on the document placement section 19.

As shown in FIG. 7, a moving section 23 that moves in linkage with the document guide 21 is provided in one of the pair of document guides 21. In the present embodiment, a part of the moving section 23 is formed integrally with the document guide 21. Thus, the moving section 23 and the document guide 21 move in a mechanically linked manner.

As shown in FIG. 4, the moving section 23 is a bar that extends from the document guide 21 to the automatic reading window 9 with penetrating the base member 17 vertically. At an end on the automatic reading window 9 side of the moving section 23, a position detection surface 23a as a surface to be detected is provided that opposes the automatic reading window 9. In the present embodiment, the position detection surface 23a is white in order that a larger part of light reflected from the position detection surface 23a should enter into the image pickup device 11.

The moving section 23 is arranged in a manner deviated outward in the width direction of the document relative to the feeding path L1 (see FIG. 5) through which the document fed by the automatic reading window 9 passes.

The position detection surface 23a can move in the longitudinal direction of the automatic reading window 9 in association with the moving section 23.

Here, the width direction of the document indicates a direction perpendicular to both of the feeding direction of the document and the thickness direction of the document in the feeding path L1.

More specifically, the moving section 23 has: a main body 23b having the shape of a rectangular pipe formed integrally with the document guide 21; and a reciprocating part 23c inserted into the main body 23b in a manner permitting reciprocating operation. The reciprocating part 23c can perform reciprocating operation in a manner sliding within the main body 23b. The moving section 23 further has a spring 23d for exerting an elastic force that presses (biases) the reciprocating part 23c toward the automatic reading window 9. The position detection surface 23a is provided at an end on the automatic reading window 9 side of the reciprocating part 23c.

As shown in FIG. 3, the automatic document feeding mechanism 15 includes: a separation suction roller 15a for auctioning and thereby separating a document placed on the document placement section 19; feed rollers 15b and 15c for separating the document having been suctioned and separated by the separation suction roller 15a and then feeding the document toward the automatic reading window 9; and a paper ejection roller 15d for ejecting to a paper ejection tray 25 the document having undergone image reading.

Here, pinch rollers 15e and 15f are rollers for pressing the fed document against the feed rollers 15b and 15c. A guide surface 15g is guiding means for turning by approximately 180° the feeding direction of the document fed from the document placement section 19 and thereby guiding the document toward the automatic reading window 9.

Further, an automatic reading document push 27 presses down the fed document toward the automatic reading window 9. The feed roller 15c side of the automatic reading document push 27 is inclined relative to the automatic reading window 9 (platen 9a) such as to be approximately in parallel to the tangential direction at the point of contact between the feed roller 15c and the pinch roller 15f.

As a result, the document fed from the document placement section 19 passes through a gap between the automatic reading document push 27 and the automatic reading window 9, then is undergone image reading, and then is ejected through a feeding path L2 to the paper ejection tray 25.

Figure 8:
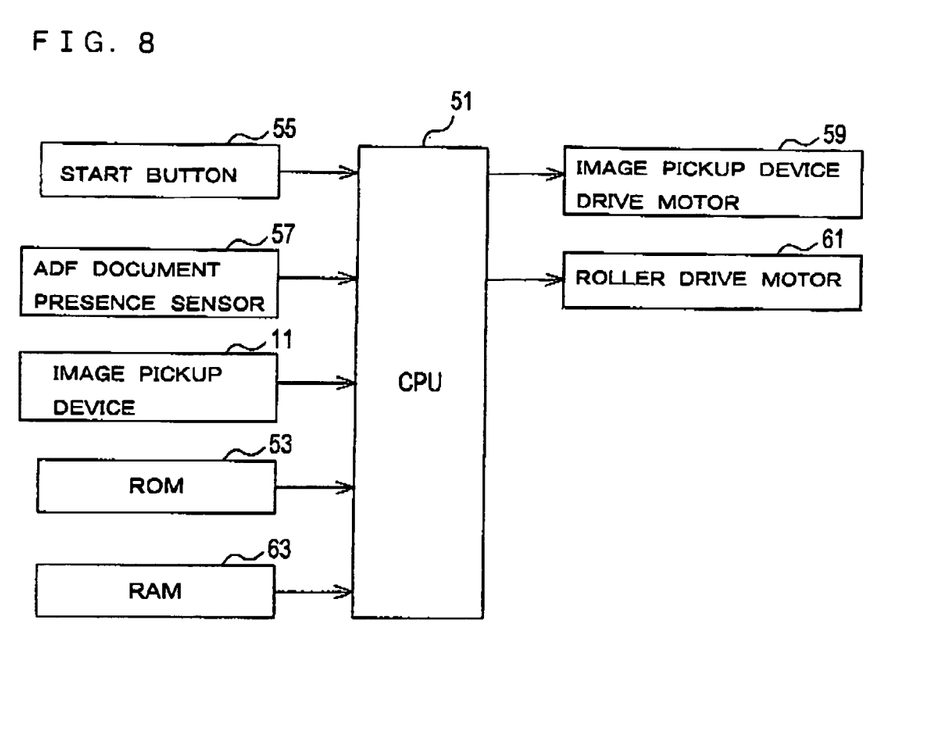
FIG. 8 is a block diagram showing a schematic electric configuration of an image reading apparatus 1 according to the embodiment.

FIG. 8 is a block diagram showing a schematic electric configuration of the image reading apparatus 1 according to the present embodiment. A CPU 51 is a processing unit for performing predetermined arithmetic processing in accordance with a program stored in a ROM 53. The ROM 53 is storage means that is composed of a flash memory, an EEPROM, or the like and can hold the storage contents even when the electric power supply is stopped.

The input side of the CPU 51 is connected to: a start button 55 for instructing the start of image reading; an ADF document presence sensor 57 for detecting whether any document is placed on the ADF (document placement section 19); and the like. On the other hand, the output side of the CPU 51 is connected to: an image pickup device drive motor 59 for moving the image pickup device 11; a roller drive motor 61 for revolving the various kinds of rollers 15a-15d constituting the automatic document feeding mechanism 15; and the like. An output signal of the image pickup device 11 is temporarily stored via the CPU 51 into storage means such as a RAM 63.

Figure 9:
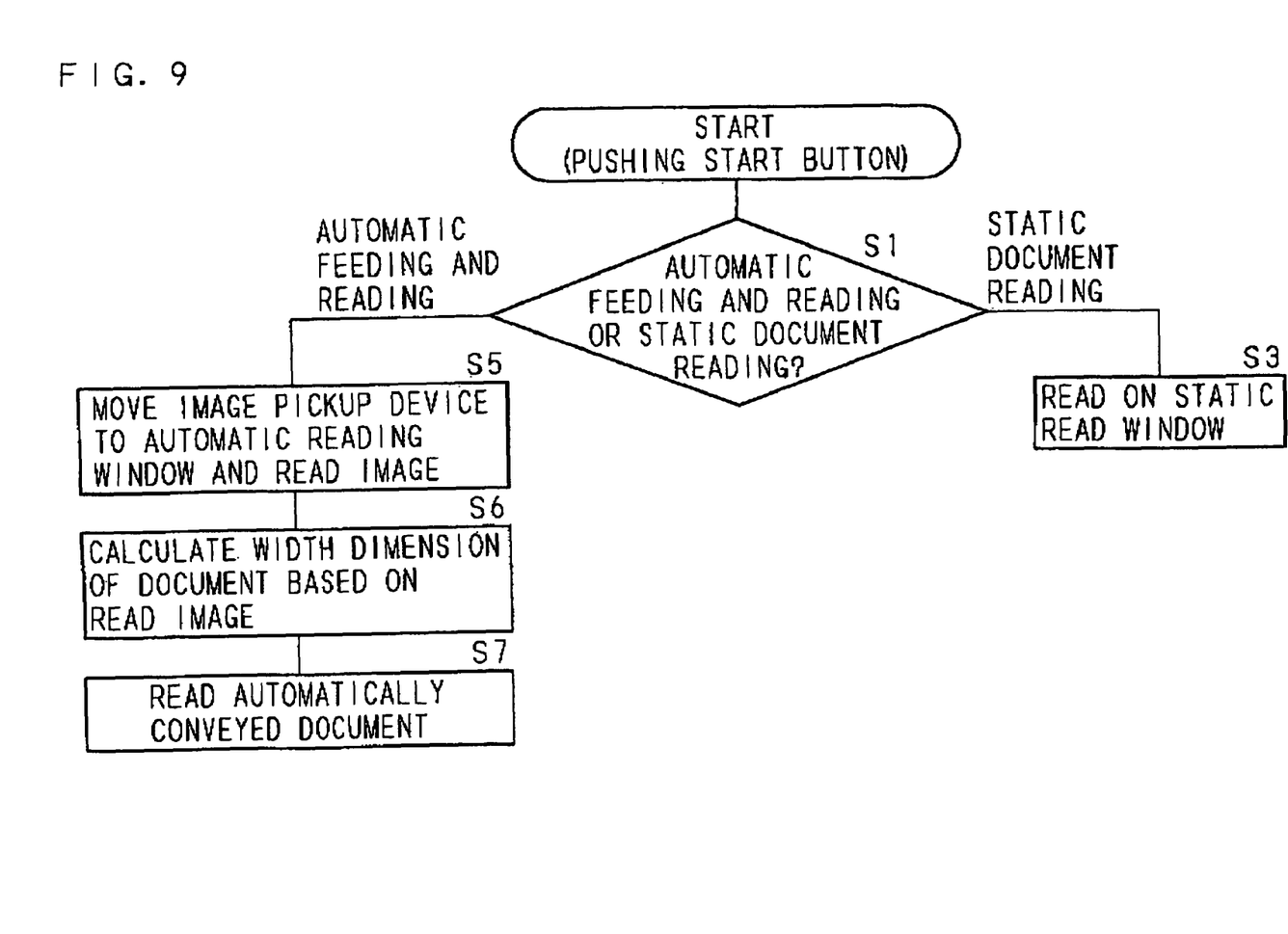
FIG. 9 is a flow chart showing a control flow from the pushing of a start button 55 to the outputting of a signal from an image pickup device 11.

FIG. 9 is a flow chart showing the outline of a control flow from the pushing of the start button 55 to the outputting of a signal from the image pickup device 11. This control flow is performed in the CPU 51.

When the start button 55 is pushed, the CPU 51 starts the control flow shown in FIG. 9, and determines first whether the static document reading function has been selected or the automatic feeding reading function has been selected, on the basis of a detection signal of the ADF document presence sensor 57 (S1).

When the detection signal of the ADF document presence sensor 57 indicates that a document is present in the document placement section 19, the CPU 51 determines that the automatic feeding and reading function has been selected. On the other hand, when the signal indicates that no document is present in the document placement section 19, the CPU 51 determines that the static document reading function has been selected.

When having determined that the static document reading function having been selected, the CPU 51 drives the image pickup device drive motor 59 and thereby causes the image pickup device 11 to read the image on the static reading window 7 (S3). On the other hand, when having determined that the automatic feeding and reading function having been selected, the CPU 51 drives the image pickup device drive motor 59, thereby moves the image pickup device 11 to the automatic reading window 9 part where the position detection surface 23a is arranged, and then causes the image pickup device 11 to read the image (S5).

On the basis of the read image data, the width dimension of the document placed on the document placement section 19 is calculated as follows (S7).

That is, in a part where the position detection surface 23a is present, a large amount of light is reflected from the position detection surface 23a and then enters into the image pickup device 11. In contrast, in a part other than the position detection surface 23a, that is, in a part where the moving section 23 is not present, a small amount of light is reflected from the part other than the position detection surface 23a and then enters into the image pickup device 11. Thus, image data is stored into the RAM 63 such that the position of the position detection surface 23a becomes white while the other part becomes black. Thus, the CPU 51 calculates the width dimension of the document from the image data stored in the RAM 63 and stored-in-advance information concerning the sizes of the document guide 21, the moving section 23, and the like.

Then, on completion of the calculation processing for the width dimension of the document, the CPU 51 drives the roller drive motor 61, thereby feeds the document, and then causes at the same time of the feeding the image pickup device 11 to read the image described in the document (S9).

In the above-mentioned configuration, it can be avoided in advance that the document fed from the automatic document feeding mechanism to the reading window collides (interferes) with the moving section. This allows the document to be fed smoothly toward the reading window.

The width direction of the document indicates a direction perpendicular to both of the feeding direction of the document and the thickness direction of the document fed in the feeding path.

Meanwhile, owing to a manufacturing variation or the like in the products, it is difficult to maintain at constant the distance between the position detection surface as a surface to be detected and the window surface of the reading window along the moving direction of the moving section. First, when the distance between the moving section and the window surface decreases in association with the movement of the moving section linked to the movement of the document guide, the contact pressure between the position detection surface and the window surface increases in association with the movement of the document guide. Accordingly, a frictional force generated in the contact surface between the position detection surface and the window surface increases. This causes a problem that the document guide cannot move smoothly. Next, when the distance between the moving section and the window surface increases, the distance between the position detection surface and the image pickup device increases. This causes a problem that the position detection surface cannot correctly be detected using the image pickup device.

This problem is solved when the dimensional accuracy and the assembling accuracy of the component parts are improved in order that the distance between the position detection surface and the window surface should become constant. Nevertheless, this solution can cause an increase in the manufacturing cost of the image reading apparatus.

In the above-mentioned configuration, even if the distance between the position detection surface and the window surface could vary in association with the movement of the document guide, the reciprocating part would displace and thereby compensate the change in the distance between the position detection surface and the window surface. This solves the above-mentioned problems that the contact pressure between the position detection surface and the window surface would increase and that the position detection surface would erroneously be detected. Further, regardless of the position of the document guide, the frictional force generated in the contact surface between the position detection surface and the window surface is maintained approximately at constant. This allows the document guide to move smoothly.

In the above-mentioned configuration, the image pickup device receives light reflected from the position detection surface, and thereby reads the position detection surface. Thus, when the position detection surface is formed in white, the contrast (difference in the lightness and darkness or contrast in the color) between the position detection surface and the other region can be enhanced. This permits reliable detection of the position of the position detection surface.

In the present embodiment, the position detection surface 23a of the moving section 23 that displaces in linkage with the displacement of the document guide 21 is detected using the image pickup device 11, so that the width dimension of the document is detected. Thus, the width dimension of the document is detected using the image pickup device 11 ordinarily provided in the image reading apparatus 1. Accordingly, the width of a document is easily detected in such a manner that an increase in the number of component parts in the image reading apparatus 1 is suppressed.

Further, since the moving section 23 is provided at a position that deviates outward relative to the feeding path L1 of the document fed from the automatic document feeding mechanism 15 to the automatic reading window 9, it can be avoided in advance that the document fed from the automatic document feeding mechanism 15 to the automatic reading window 9 collides (interferes) with the moving section 23. This allows the document to be fed smoothly toward the automatic reading window 9.

Meanwhile, owing to a manufacturing variation or the like in the products, it is difficult to maintain at constant the distance between the position detection surface 23a and the automatic reading window 9 across the entirety of the width direction of the document.

Thus, if the distance between the moving section 23 and the automatic reading window 9 could decrease in association with the displacement of the document guide 21, the contact surface pressure between the position detection surface 23a and the automatic reading window 9 would increase in association with the displacement of the document guide 21, so that a frictional force generated in the contact surface between the position detection surface 23a and the automatic reading window 9 would increase. This would cause a problem that the document guide 21 could not displace smoothly.

On the contrary, if the distance between the moving section 23 and the automatic reading window 9 could increase, the amount of light reflected from the position detection surface 23a and then received by the image pickup device 11 would decrease. This would reduce the contrast (difference in the lightness and darkness or contrast in the color) between the position detection surface 23a and the other part. This would cause a problem that the position detection surface 23a could not correctly be detected using the image pickup device 11.

This problem is solved when the dimensional accuracy and the assembling accuracy of the component parts are improved in order that the distance between the position detection surface 23a and the automatic reading window 9 should become constant. Nevertheless, this solution can cause an increase in the manufacturing cost of the image reading apparatus 1.

In contrast, in the present embodiment, the moving section 23 is provided at an end on the automatic reading window 9 side of the reciprocating part 23c that can move in a direction perpendicular to the automatic reading window 9. Thus, even if the distance between the position detection surface 23a and the automatic reading window could vary in association with the displacement of the document guide 21, the reciprocating part 23c would displace and thereby absorb the change in the distance between the position detection surface 23a and the automatic reading window 9. This would avoid that the contact surface pressure between the position detection surface 23a and the automatic reading window 9 could increase and that the position detection surface 23a would erroneously be detected.

Further, regardless of the position of the document guide 21, the frictional force generated in the contact surface between the position detection surface 23a and the automatic reading window 9 is maintained approximately at constant. This allows the document guide 21 to displace smoothly.

Further, in the present embodiment, the position detection surface 23a is formed in white. Thus, the contrast (difference in the lightness and darkness or contrast in the color) between the position detection source 23a and the other part can be enhanced. This permits reliable detection of the position of the position detection surface 23a.

Other Embodiments

In the above-mentioned embodiment; the moving section 23 has been provided only in one document guide 21 among the pair of document guides 21. However, the present invention is not limited to this. That is, a moving section 23 may be provided in each of the pair of document guides 21. This permits more accurate detection of the width dimension (size) of the document.

Further, in the above mentioned embodiment, the document guide 21 has been provided in each of the edges of the width direction. However, the present invention is not limited to this. That is, one edge of the width direction may be abutted against the fixed wall surface, while the document guide 21 of a movable type may be provided only at the other edge.

Further, in the above-mentioned embodiment, the present invention has been applied to an image reading apparatus having the automatic feeding and reading function and the static document reading function. However, the present invention is not limited to this. That is, the present invention may be applied to an image reading apparatus having only the automatic feeding and reading function or an image reading apparatus integrated with an image forming apparatus such as an ink-jet printer and a laser beam printer, or alternatively to a facsimile machine, a copy machine, or the like.

Further, in the above-mentioned embodiment, the reciprocating part 23c has been pressed toward the automatic reading window 9 by the spring 23d. However, the present invention is not limited to this. That is, for example, the spring 23d may be omitted, while the reciprocating part 23c may always be pressed against the automatic reading window 9 by the self weight of the reciprocating part 23c.

Further, in the above-mentioned embodiment, the position detection surface 23a has been formed in white. However, the present invention is not limited to this. That is, for example, the part other than the position detection surface 23a may be formed such that a larger amount of light should be reflected and then enter into the image pickup device 11, while the position detection surface 23a may be formed in black, so that a smaller amount of light should be reflected from the position detection surface 23a and then enter into the image pickup device 11 in comparison with the part other than the position detection surface 23a.

Further, in the above-mentioned embodiment, the position detection surface 23a has been capable of displacing in a direction perpendicular to the automatic reading window 9. However, the present invention is not limited to this.

Further, in the above-mentioned embodiment, the document guide 21 and the moving section 23 (main body 23b)

have been formed integrally with each other. However, the present invention is not limited to this. That is, the document guide 21 and moving section 23 may be constructed such as to displace in a mechanically linked manner by means of a linkage mechanism, a gear wheel mechanism, or the like.

Further, in the above-mentioned embodiment, the automatic reading window 9 and the static reading window 7 have been provided independently. However, the present invention is not limited to this. That is, the present invention may be applied to an image reading apparatus in which both reading windows 7 and 9 are shared.

Further, in the above-mentioned embodiment, the image pickup device 11 has been composed of a CIS. However, the present invention is not limited to this. That is, for example, a CCD (Charge-Coupled Device) may be employed.

Further, in addition to the above-mentioned embodiments, a storage area may be configured to store data of the image data, for example, read by the image pickup device 11. In the case such as facsimile transmission of an obtained image data, the storage area need to be allocated for storing data of the image based on the detected position of the moving portion.

Further, the embodiments require solely agreement with the spirit of the invention described in the claims, and is not limited to the above-mentioned embodiments.

As this description may be embodied in several forms without departing from the spirit of essential characteristics thereof, the present embodiments are therefore illustrative and not restrictive, since the scope is defined by the appended claims rather than by description preceding them, and all changes that fall within metes and bounds of the claims, or equivalence of such metes and bounds thereof are therefore intended to be embraced by the claims.

What is claimed is:

1. An image reading apparatus for reading an image recorded on a document, comprising:
    a document holding portion onto which said document is held;
    a document feeding unit for feeding said document held on said document holding portion;
    a reading window on which said document fed by said document feeding unit is located;
    an image pickup device for reading an image through said reading window;
    a document guide configured to guide the document to be fed, which is configured to be movable in a width direction which is perpendicular to a feeding direction of the document to be fed;
    a moving portion configured to move in linkage with said document guide and oppose said reading window; and
    a controller configured to detect a position of said moving portion based on an image of the moving portion read through said reading window by said image pickup device and determine a width dimension of the document based on the detected position of said moving portion.

2. The image reading apparatus according to claim 1, wherein said moving portion is arranged in a manner deviated outward in the width direction relative to a document feeding path.

3. The image reading apparatus according to claim 1, wherein said moving portion has a reciprocating part configured to perform a reciprocating operation in a direction perpendicular to a reading window surface, and said reciprocating part is provided on a reading window side in said moving portion.

4. The image reading apparatus according to claim 3, wherein said reciprocating part has a surface to be detected which opposes said reading window.

5. The image reading apparatus according to claim 4, wherein said surface to be detected is white.

6. The image reading apparatus according to claim 3, wherein said moving portion further comprises an elastic body for biasing said reciprocating part against the reading window surface.

7. The image reading apparatus according to claim 1, wherein said moving portion has a surface to be detected which opposes said reading window.

8. The image reading apparatus according to claim 7, wherein said surface to be detected is white.

9. An image reading apparatus for reading an image recorded on a document, comprising:
    a document holding portion onto which said document is held;
    a document feeding unit configured to feed said document held on said document holding portion;
    a reading window on which said document fed by said document feeding unit is located;
    an image pickup device configured to read an image through said reading window;
    a document guide configured to guide the document to be fed at the document holding portion, which is configured to be movable in a width direction which crosses a feeding direction of the document to be fed;
    a moving portion configured to move in linkage with the said document guide and oppose said reading window;
    a controller configured to detect a position of said moving portion based on an image of the moving portion read through said reading window by said image pickup device and determine a width of the document based on the detected position of said moving portion.

10. An image reading apparatus for reading an image recorded on a document, comprising:
    a document holding portion onto which said document is held;
    a document feeding unit configured to feed said document held on said document holding portion;
    a reading window on which said document fed by said document feeding unit is located;
    an image pickup device configured to read an image through said reading window;
    a document guide configured to guide the document to be fed at the document holding portion, which is configured to be movable in a width direction which crosses a feeding direction of the document to be fed;
    a moving portion configured to move in linkage with the said document guide and oppose said reading window;
    a storage area configured to store data of said image data; and
    a controller configured to detect a position of said moving portion based on an image of the moving portion read through said reading window by said image pickup device and allocate a storage area for storing data of said image based on the detected position of said moving potion.

* * * * *

UNITED STATES PATENT AND TRADEMARK OFFICE
CERTIFICATE OF CORRECTION

PATENT NO.       : 7,796,308 B2
APPLICATION NO.  : 11/521499
DATED            : September 14, 2010
INVENTOR(S)      : Sakakibara et al.

It is certified that error appears in the above-identified patent and that said Letters Patent is hereby corrected as shown below:

Column 10, Claim 10, Line 62:
    Please delete "potion" and insert --portion--.

Signed and Sealed this
Twenty-first Day of June, 2011

David J. Kappos
*Director of the United States Patent and Trademark Office*